United States Patent [19]

Galer et al.

[11] 4,350,533

[45] Sep. 21, 1982

[54] HIGH EARLY STRENGTH CEMENT

[75] Inventors: Richard E. Galer, Hanover Park; John R. Blasius, Evanston; Paul C. Webb, Arlington Heights, all of Ill.

[73] Assignee: United States Gypsum Company, Chicago, Ill.

[21] Appl. No.: 289,589

[22] Filed: Aug. 3, 1981

[51] Int. Cl.$^3$ ................................................. C04B 7/02
[52] U.S. Cl. ...................................... 106/89; 106/104; 106/109; 106/97
[58] Field of Search ...................... 106/89, 104, 109, 97

[56] References Cited

U.S. PATENT DOCUMENTS

| | | | |
|---|---|---|---|
| 3,775,143 | 11/1973 | Mikhailov et al. | 106/89 |
| 3,861,929 | 1/1975 | Deets et al. | 106/89 |
| 3,922,172 | 11/1975 | Crinkelmeyer et al. | 106/109 |
| 4,045,237 | 8/1977 | Gaines et al. | 106/89 |
| 4,157,263 | 6/1979 | Gaines et al. | 106/104 |
| 4,216,022 | 8/1980 | Wilson | 106/104 |

*Primary Examiner*—James Poer
*Attorney, Agent, or Firm*—Robert M. Didrick; Samuel Kurlandsky; Robert H. Robinson

[57] ABSTRACT

A rapid reaction of high alumina cement, gypsum, lime and water produces cementitious compositions in which the only significant factor contributing to strength during the very early stages of hydration (i.e., a few minutes to a few hours) is the formation of an amount of ettringite equal to from about 40% to about 60% of the weight the paste of water, the high alumina cement, the gypsum source, and the lime source. A substantially impermeable concrete having a 4-hour compressive strength of about 8000 p.s.i. may be produced from the cement powder of this invention.

21 Claims, No Drawings

HIGH EARLY STRENGTH CEMENT

This invention relates to a hydraulic cement having high early strength characteristics. More particularly, it relates to the formation of a cementitious product such as concrete in which the significant factor contributing to the hardening thereof during the very early stages of hydration is the formation of substantial amounts of ettringite. Still more particularly, it relates to a hydratable cement powder comprising major amounts of high alumina cement and calcium sulfate and a minor amount of reactable lime.

A description of cement technology suitable for an understanding of the background of the present invention can be found in Scientific American, April 1964, pages 80–90; Kirk-Othmer's Encyclopedia of Chemical Technology, 2d ed., Vol. 5, pages 684–710 (1964); and ACI Journal, August, 1970, pages 583–610. The following abbreviations for the cumbersome formulas of cement compounds will be used herein in accordance with the general practice in the cement industry:

C represents calcium oxide (CaO)
A represents aluminum oxide ($Al_2O_3$)
F represents ferric oxide ($Fe_2O_3$)
M represents magnesium oxide (MgO)
S represents silicon oxide ($SiO_2$)
K represents potassium oxide ($K_2O$)
N represents sodium oxide ($Na_2O$)
H represents water ($H_2O$)
$\bar{S}$ represents sulfur trioxide ($SO_3$)
$\bar{C}$ represents carbon dioxide ($CO_2$)

Thus, ettringite is $C_3A(C\bar{S})_3H_{32}$.

The term "hydraulic cement" as used herein, is understood to include any cement which has the characteristic of hardening under water e.g., portland cement, blends of portland cement and natural cement, pozzolanic cements, slag cement, masonry cement, oil well cement, white portland cement, mixtures of portland cement and blast-furnace slag cement and like materials. The term "concrete" is used to designate a mixture of hydraulic cement, aggregate, and water. This material sets to form a hard mass. The "aggregate" may be mineral or non-mineral, including naturally occurring materials such as sand, gravel or quarried rock, or manufactured aggregate such as expanded shale, clay, and the like. The term "mortar" is used herein to designate a mixture of hydraulic cement, fine aggregate and water. The term "grout" designates a mixture of hydraulic cement and water, and sometimes fine sands. Grouts normally have higher fluidity than mortars and can be pumped through pipe lines and forced into small spaces, for instance, into voids or cracks or porous concrete, or into spaces between preplaced aggregate or under machinery and heavy equipment.

In the construction industry, and particularly in the repair of concrete structures such as highways and structural walls and platforms, and the filling of voids and holes to form stable underpinnings or foundations for machinery and heavy equipment, there has been a long felt need for cementitious compositions which will set within a relatively short period of time into a hard mass with sufficient strength to withstand applied stresses and loads. In order to have commercial value, this type of cementitious composition must also have good bonding characteristics, early as well as long-term strength, practical field workability times, and be capable of withstanding freezing and thawing as well as the action of salts and the corrosive substances. Advantageously, the cementitious composition should be capable of self-leveling properties so that the resultant material, when used in patching operations, will not create cavities or crown which would cause damage to the adjacent area of the structure. In addition, the applied composition should possess fluid barrier properties so that they are impermeable to liquid and vapor, particularly moisture.

Attempts have been made in the past to formulate cementitious compositions possessing one or more of the above properties, but such attempts, particularly when directed to the achievement of all of the foregoing desirable properties in a single composition, have met with only limited success mainly because the resulting products after mixing with water and placement using the customary techniques have failed to develop acceptable strengths within a desirably short period of time after setting without shrinkage. Furthermore, the failure of many of these products to achieve a high degree of impermeability to fluids, particularly water, has precluded their use in certain applications, e.g., grouting and water proofing, where that property is often critical.

Mixtures of portland cement and high alumina cement have been formulated as described in Chemistry and Industry, 1952, pages 2–7. Chervenka et al., however, say in U.S. Pat. No. 3,997,353 that although such mixtures provide a cement having a high early strength, the ultimate strength is less than that obtained from either cement alone.

In a paper entitled "Expansive Cements", published in the Proceedings of the 3rd International Symposium on the Chemistry of Cement (1952), H. LaFuma states at page 584 that the cement made by grinding a sulfoaluminous clinker composed of calcium sulfate, dicalcium silicate and calcium aluminate produces remarkable strength at early ages. His interest, however, was in the expansive cement produced by mixing the sulfoaluminous cement with portland cement and there is no discussion of the strength attainable from such mixtures.

The effect of calcium aluminates on the early strength of portland cements had been shown earlier, though, by Spackman et al. in U.S. Pat. No. 903,019 and by Schenker et al. in U.S. Pat. No. 2,465,278. Spackman et al. taught that the addition of from 2 to 20% of calcium aluminate and from 1 to 3% of calcium sulfate to natural cement or mixtures of portland cement and natural cement produces a cement having greater strength at early ages. Schenker et al. taught that the flexural strength of concrete can be increased 50% or more when calcium aluminate and calcium sulfate are incorporated in the cement. Calcium aluminate, per se, is not added; it is formed in situ from hydrated lime and an aluminous compound. The amounts of calcium aluminate and calcium sulfate incorporated range from about 0.3% to 8% $C_3A$ and from about 0.5% to 14% $C\bar{S}$.

Sadran (U.S. Pat. No. 3,645,750) teaches that the addition of calcined gypsum improves the rather poor early age strengths obtained from a mixture of tricalcium silicate and aluminous cement. Ternary mixtures of from 50–75 percent aluminous cement, 25–30 percent tricalcium silicate and 0–25 percent gypsum are said to be typical.

In U.S. Pat. No. 3,775,143, Mikhailov et al. state that a mixture of 62% portland cement, 20% alumina cement, 14% gypsum and 4% lime provides a concrete having a compressive strength of 4950 p.s.i. after one day, 2133 p.s.i. after 7 days and 6500 p.s.i. after 28 days. A typical Type III portland cement develops an ultimate strength in 28 days of about 6000 to 75000 p.s.i. The low 7-day strength is notable.

Chervenka et al. teach in their U.S. Pat. No. 3,997,353 a cement composition comprising portland cement, calcium aluminate and calcium sulfate which will develop a compressive strength of at least 4000 p.s.i. The composition is described as comprising from 45 to 70% portland cement, from 25 to 45% of additional calcium aluminate and from 5–20% calcium sulfate. An amount of free lime greater than 2% of the weight of the portland cement in the mixture is said to be deleterious.

In contrast to the high content of portland in the Chervenka cement, Gaines et al. in U.S. Pat. No. 4,045,237 teaches the use of a mixture containing between 50 and 90 percent high alumina cement, between 0.1 and 10 percent of portland and between 0.1 and 40 percent calcined gypsum.

The role of ettringite in expansive cements is related in U.S. Pat. No. 4,255,398. There it is said that it is important in an expanded admixture that ettringite does not precipitate from the liquid phase during hydration of the cement but forms on the surface of solids already present. Ost et al. in U.S. Pat. No. 3,860,433 teach the formation of very high early strength cements (i.e., up to about 5000 p.s.i. within 24 hours) by an abnormally fast and complete reaction of the two principal ingredients in the cement, calcium sulfate and $3CaO.3Al_2O_3.CaSO_4$, during hydration in a low lime environment. Complete conversion of the ternary compound to ettringite is avoided and the expansive properties of the cement are said to be regulated by the low lime environment.

In British Patent Application No. 2,040,906, published Sept. 3, 1980, Azuma et al. teach an inorganic hardened product comprising a four component system of portland cement, gypsum, ettringite and an ettringite precursor. The product was developed to overcome the problem of carbon dioxide attack on and consequent deterioration of cement products in which ettringite is the main component. The product is made by casting a slurry of portland cement, gypsum and an ettringite precursor and, after a period of not less than 4 hours but not more than 8 hours, aging the mixture at a temperature of 80° to 90° C. for 6 to 48 hours. The aging is taught to be necessary to prevent expansion of the product by the uncontrolled formation of ettringite.

Now, however, it has been discovered that the maximum early age strengths of cementitious compositions comprising mixtures of high alumina cement, gypsum and a source of available lime is achieved when the weight of ettringite produced in the early stages of hydration is equal to from about 40% to about 60% of the weight of the paste fraction (i.e. water+cement) of the cementitious composition.

It is an object of this invention to provide a cementitious composition which will develop a compressive strength of at least about 2,000 p.s.i. (13 mega Pascals) within about 3 hours after hydration commences and as much as about 8000 p.s.i. (55 mega Pascals) within about 4 hours.

It is another object of this invention to provide a cementitious composition having such high early strength and also a high long term strength.

It is yet another object of this invention to provide a non-expansive cementitious composition in which ettringite comprises from about 2% to about 60% of the total weight.

It is a further object of this invention to provide a cementitious composition which is substantially impermeable to liquids.

These and other objects of the invention which will become apparent from the following disclosure are achieved by a hydraulic cement powder comprising by weight from about 18% to about 65% high alumina cement, from about 16% to about 35% calcium sulfate (20 to 44% gypsum), from 0 to about 65% portland cement, and from 0 to about 8.5% extraneous lime. The portland cement and extraneous lime are alternative or complementary sources of calcium oxide during hydration of the cement powder of this invention. It has been discovered that the calcium oxide supplied must be from about 3.5% to about 8.5% of the weight of the powder. Preferably the amount is from about 4% to about 6%; more preferably it is from about 4.5% to about 5.5%. Extraneous lime is that which is added independently of that which is available from the other components of the cement powder. The extraneous lime may be in the form of quicklime (C) or slaked lime (CH).

High alumina cement, known also as aluminous cement, has an $Al_2O_3$ content of about 36–42%. The most important compounds present are the several calcium aluminates, designated herein as CA. The amount of alumina that can be converted to ettringite from high alumina cement in a short enough time period after mixing with water to produce fast setting characteristics is primarily dependent on the amount of very fine aluminate particles available for solution in the mix water. In order for the reaction to proceed rapidly, aluminate ions must be present in the aqueous phase of the cementitious mixture. The reaction of CA, C, and C$\bar{S}$ to yield ettringite proceeds rapidly when continuous saturation of the aqueous phase is promoted by the presence of very small aluminate particles and/or crystals formed at low fusion temperatures. Thus, a large amount of high alumina cement having a small percentage of fine particles or a small amount of the cement having a high percentage of fine particles is desirable. Regrinding of the high alumina cement to a higher fineness allows the utilization of more of the alumina for the production of ettringite within a short period of time. The surface area of the high alumina cement may be from about 3000, more often, 4000 sq. cm./gram to about 9000 sq. cm./gram, as measured by the Blaine method. The amount of high alumina cement in the cement powder of this invention is usually within the range of from about 20% to about 60%; a preferred amount is about 30% or more.

The calcium sulfate may be in the form of gypsum, the hemi-hydrate, soluble or insoluble anhydrite, or dead-burned synthetic C$\bar{S}$. Because calcium sulfate is the most soluble of the reactants in the hydration reactions, its particle size is not so critical to the speed of the hydration. A preferred amount of calcium sulfate is from about 18% to about 30%. More preferably, the amount is from about 20% and up. Various grades of gypsum, such as landplaster and terra alba, may be used but a minimum purity of about 90% is desirable.

As mentioned earlier, the lime available for ettringite formation may come from portland cement entirely or some or all of it may be added as quick lime or slaked lime. The available lime in portland cement comes from the free lime that is always present and from the hydrolysis of $C_3S$. Hydrolysis of $C_2S$ also provides some lime but to a much lesser extent. The total amount of lime available from portland cement may be as high as about 20% but it is typically about 10%. The cement powder of this invention may comprise from 0% to about 45% portland cement and from 0% to about 6% extraneous lime. A preferred powder comprises from about 3% to about 40% portland cement and from 2% to about 6% extraneous lime.

The cement powder of this invention is further characterized by the ratios of the high alumina cement, portland cement, and extraneous lime to the calcium sulfate present. An important property of the cementitious compositions of this invention, such as concrete, grouts, and mortars, is low alkalinity. The pH of a composition of this invention ranges downward from about 11.5 whereas the pH of a portland cement mix is usually about 12.5. To maintain the desired alkalinity it is important that there be a slight excess of uncombined gypsum relative to available lime remaining in the set cementitious composition. But, to avoid expansion of the set composition there must be no more than about 1% of uncombined gypsum in the hardened composition. This is because the calcium aluminates are the least soluble of the three reactants in the formation of ettringite and, therefore, the longest lingering component of the cement. The long term presence of calcium aluminates is not easily avoided so the avoidance of expansion is achieved by providing for the exhaustion of the supply of calcium sulfate and free lime. In other words, the correct amounts of alumina, lime and gypsum must be rapidly available in the correct ratios to keep the reaction represented by equation (1) going until substantially all of the available lime and gypsum are used up.

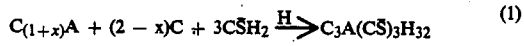

(1)

wherein x can vary from 0 to 2 and is determined by the amount of reactable C in the high alumina cement and the amount of $C_3A$ in the portland cement. The quantity $(2-x)$ is supplied by extraneous lime and by lime generated by the hydrolysis of the $C_3S$ in the portland cement.

One way to do this is to observe certain ratios during formulation of the cement powder. Generally, the weight ratio of high alumina cement to calcium sulfate is from about 1:1 to about 2.5:1, the weight ratio of extraneous lime to calcium sulfate is from 0:1 to about 0.4:1, and the weight ratio of portland cement to calcium sulfate is from 0:1 to about 4:1. Preferably, the ratios are from about 1.8:1 to about 2.4:1, from 0:1 to about 0.3:1, and from 0:1 to about 3:1, respectively. Particularly preferred is a cement powder in which there are from about 2 to about 2.4 parts of high alumina cement per part of calcium sulfate, from about 5 to about 10 parts of calcium sulfate per part of extraneous lime, and from about 0.1 to about 2 parts of portland cement per part of calcium sulfate.

Another way to provide for the proper ratios of reactants in solution is to use hot water as the mix water when the cementitious compositions of this invention are being prepared. Lime is less soluble in hot water than in cold whereas the solubility of alumina and gypsum follows the rule of thumb that solids dissolve more readily as the temperature of the solvent is increased. Therefore, the amounts of the three reactants in solution may be adjusted to the proper proportions by adjusting the temperature of the mix water and, ipso facto, the initial hydrating mixture. The temperature of the mix water may be as high as about 150° F. but may also be at the usual tap water temperature of about 50°–55° F. A water temperature within the range of from about 100° F. to about 140° F. is often used. The temperature of the initial mixture of cement powder, water and other ingredients is usually within the range of from about 70° F. to about 100° F. It is recognized that the internal temperature of a set cementitious article may continue to rise while hydration continues but such a later age temperature does not affect the formation of ettringite in the early age mixture.

Nevertheless, the amount of free lime generated by later age reactions associated with the maturing of the cementitious composition should be controlled to avoid conversion of ettringite to monosulfate and a concomitant loss of compressive strength. The ratio of free lime to residual gypsum should not be greater than about 0.3:1 by weight. Included among several ways to guard against the later age build-up of lime are: providing for the generation of $AH_3$, using a portland cement having a low $C_3S$ content, and using fly ash or other pozzolanic material to consume free lime.

Hydration of the cement powder thus described produces a hardened cement product in which the significant factor contributing to the product's strength during the very early stages of hydration is the formation of substantial amounts of ettringite. About 40 weight percent of the cement/water paste is converted to ettringite in about 3 to 4 hours. Essentially all of the potential ettringite is formed within 24 hours and 90% of that is formed in the first 10 to 20 hours after hydration commences. The water/cement ratio used in mixing the cementitious compositions of this invention may be from about 0.25:1 to about 0.8:1, by weight. Preferably, said ratio is about 0.5:1 or less.

The amount of water used is determined at least partially by the affinity for water of each of the components and by the surface area thereof. As with high alumina cement, the Blaine values for each of the other components may be in the 3000–9000 range. Because water must be readily accessible for the rapid formation of ettringite, it is preferred to use at least about 115% of the theoretical amount called for by equation (1).

A pozzolanic material such as montmorillonite clay, diatomaceous earth, pumicite, and fly ash may be included in the cement powder as an optional ingredient. When used it usually replaces part or all of the portland cement. The cement powder of this invention may comprise up to about 20% pozzolan by weight but the amount is usually about 10% or less. A representative fly ash has a Blaine surface area of only about 4000 but its high water demand is a limitation on the amount used.

Surface active agents may be advantageously employed in the cementitious mixtures of this invention and may serve more than one purpose, e.g., as wetting agents or dispersing agents, depending upon their concentration, and as water retention agents and air-entraining agents. The sodium salt of a condensed formaldehyde/naphthalene sulfonic acid known as Lomar D is exemplary. Said admixtures will range from about 0.1% to about 2% of the total cement weight.

Other admixtures commonly used in hydraulic cement mixes may be used with the cementitious compositions of this invention to regulate the setting time, reduce the water demand, entrain air, or increase the compressive and/or flexural strength. Citric acid, sucrose, glucose and mixtures thereof are examples of such admixtures.

The cementitious compositions of this invention include the various concretes, mortars and grouts that may be prepared from the powder described above. The ratio of cement powder to aggregate in the concretes, mortars and sanded grouts of this invention will vary according to the function of the article cast from the composition and according to the nature of the aggregate. Thus, there may be very rich mixtures such one having 4 parts of cement and 3 parts of aggregate, by weight. Usually, the weight ratio is from about 1:1 to about 1:9, more often, about 1:6 or less, but mixtures as lean as about 1:20 may be used in foundry molds. Overall, the cement/aggregate ratio is in range of from about 2:1 to about 1:20, by weight.

Special mixes of the cement powder of this invention with water, aggregate and a dispersant have been prepared to have an initial setting time (Gillmore needle) of from 5 to 15 minutes and a final set within 15 to 30 minutes but the initial setting time for C-109 mortars containing the cement powder of this invention are usually from about 20 to about 35 minutes and the final set occurs within about 35 to about 60 minutes.

The following examples illustrate specific cement powders and cementitious compositions made therefrom. The Blaine value for the HAC (high alumina cement) is 3950 unless otherwise stated. The landplaster contains about 90% gypsum or about 71% C$\bar{\text{S}}$. The compressive strength may be expressed in mega Pascals by dividing the p.s.i. value by 145.

| Example Number | Blaine of HAC if re Ground | Cement (Weight %) | | | | | | Weight % Of Cement | | | Flow | W/C |
|---|---|---|---|---|---|---|---|---|---|---|---|---|
| | | HAC | Land-Plaster | Terra Alba | Portland Cement | CH | Fly Ash | Lomar D | Slag | C-109 Sand | | |
| 1 | — | 38.0 | — | 26.0 | 36.0 | — | — | 2.0 | — | 275 | — | 0.372 |
| 2 | — | 43.0 | — | 28.0 | 29.0 | — | — | 2.0 | — | 275 | — | 0.372 |
| 3 | — | 40.0 | 33.0 | — | 27.0 | — | — | 2.0 | — | 275 | — | 0.372 |
| 4 | — | 39.8 | 32.8 | — | 26.9 | 0.50 | — | 2.0 | — | 275 | 76.1 | 0.372 |
| 5 | — | 40.0 | 25.0 | — | 27.0 | — | 8.0 | 2.0 | — | 275 | 79.2 | 0.372 |
| 6 | — | 37.5 | 28.9 | — | 33.2 | — | — | 2.0 | — | 275 | 68.8 | 0.372 |
| 7 | — | 46.0 | 34.0 | — | 10.0 | 4.0 | 6.0 | 1.0 | — | 275 | 83.9 | 0.40 |
| 8 | — | 46.0 | 34.0 | — | 10.0 | 4.0 | 6.0 | 1.0 | — | 275 | 101.8 | 0.43 |
| 9 | — | 46.0 | 34.0 | — | 15.0 | 3.5 | 1.5 | 1.0 | — | 275 | 100.4 | 0.43 |
| 10 | — | 46.0 | 30.0 | — | 24.0 | — | — | 2.0 | 102 | — | — | 0.28 |
| 11 | — | 42.0 | 28.0 | — | 30.0 | — | — | 2.0 | 102 | — | — | 0.28 |
| 12 | — | 42.0 | 28.0 | — | 30.0 | — | — | 2.0 | 102 | — | — | 0.29 |
| 13 | — | 46.9 | 29.4 | — | 15.6 | 3.0 | 5.0 | 1.0 | 100 | — | — | 0.325 |
| 14 | 5650 | 46.9 | 29.4 | — | 15.6 | 3.0 | 5.0 | 1.0 | 100 | — | — | 0.325 |
| 15 | 5650 | 46.4 | 29.1 | — | 15.5 | 4.0 | 5.0 | 1.0 | 100 | — | — | 0.325 |
| 16 | 5650 | 41.0 | 32.7 | — | 17.4 | 4.0 | 5.0 | 1.0 | 100 | — | — | 0.325 |
| 17 | 5650 | 38.2 | 34.5 | — | 18.3 | 4.0 | 5.0 | 1.0 | 100 | — | — | 0.325 |
| 18 | 5650 | 35.5 | 36.3 | — | 19.3 | 4.0 | 5.0 | 1.0 | 100 | — | — | 0.325 |
| 19 | — | 46.4 | 34.6 | — | 10.0 | 4.0 | 5.0 | 1.0 | 100 | — | — | 0.325 |
| 20 | 5650 | 46.2 | 34.4 | — | 10.0 | 4.5 | 5.0 | 1.0 | 100 | — | — | 0.325 |
| 21 | 5650 | 38.0 | 40.7 | — | 11.8 | 4.5 | 5.0 | 1.0 | 100 | — | — | 0.325 |
| 22 | — | 54.0 | 36.4 | — | 4.7 | 4.9 | — | 1.0 | 100 | — | — | 0.369 |
| 23 | — | 47.3 | 32.0 | — | 15.5 | 4.0 | 1.2 | 1.0 | 100 | — | — | 0.369 |
| 24 | — | 47.3 | 30.0 | — | 15.5 | 4.0 | 3.2 | 1.0 | 100 | — | — | 0.369 |
| 25 | — | 37.8 | 25.6 | — | 33.9 | 2.7 | — | 1.0 | 100 | — | — | 0.369 |
| 26 | — | 37.8 | 25.6 | — | 23.2 | 3.4 | 10 | 1.0 | 100 | — | — | 0.369 |
| 27 | — | 37.8 | 25.6 | — | 33.9 | 2.0 | 0.7 | 1.0 | 100 | — | — | 0.369 |
| 28 | — | 37.8 | 24.0 | — | 33.9 | 2.0 | 2.3 | 1.0 | 100 | — | — | 0.369 |

| Example Number | Gillmore Set Times (Minutes) | | Compr. Strength (PSI) | | | | | |
|---|---|---|---|---|---|---|---|---|
| | Init. | Final | 3-Hr. | 24-Hr. | 7-Day Humid | 7-Day Water | 28-Day | 6-Mo. |
| 1 | 24 | 36 | 4225 | 6313 | — | 6950 | 7350 | 7900 |
| 2 | 21 | 38 | 4198 | 5613 | — | 5675 | 7900 | 8000 |
| 3 | 34 | 50 | 3800 | 5038 | — | 6463 | 6963 | 7425 |
| 4 | 32 | 55 | 3894 | 4785 | — | 3431 | 6763 | 6975 |
| 5 | 33 | 59 | 3325 | 4880 | — | 5600 | 5875 | 6488 |
| 6 | 19 | 32 | 3519 | 4263 | — | 5075 | 5750 | 7100 |
| 7 | 13 | 33 | 2870 | 5195 | 6700 | 6250 | — | — |
| 8 | 20 | 34 | 2295 | 4270 | 5525 | 5487 | — | — |
| 9 | 13 | 28 | 2393 | 4418 | 6587 | 5787 | — | — |
| 10 | 6 | 20* | 4534 | 9350 | 11700 | 11400 | — | — |
| 11 | 8 | 25* | 6144 | 9166 | 11625 | 11700 | — | — |
| 12 | 27 | 88 | 3588 | 8550 | 9750 | 8956 | — | — |
| 13 | 9 | 15 | 5490 | 8060 | 10000 | 9700 | — | — |
| 14 | 6 | 8 | 3070 | — | 8980 | — | — | — |
| 15 | 6 | 8 | 4190 | 8280 | 9710 | — | — | — |
| 16 | 5 | 9 | 4830 | 7930 | 10130 | — | — | — |
| 17 | 7 | 13 | 5140 | 7900 | 9850 | — | — | — |
| 18 | 8 | 13 | 5780 | 7680 | 9810 | — | — | — |
| 19 | 7 | 16 | 6590 | 8800 | 10150 | 10250 | — | — |
| 20 | 6 | 10 | 4400 | 8150 | 9580 | — | — | — |
| 21 | 8 | 13 | 5900 | 8310 | 10590 | — | — | — |
| 22 | 9 | 27 | 2740 | 5065 | 6437 | 6575 | — | — |
| 23 | 16 | 33 | 3613 | 4950 | 5275 | 5837 | — | — |

-continued

| | | | | | | | | |
|---|---|---|---|---|---|---|---|---|
| 24 | 3 | 9 | 4185 | 5981 | 7400 | 7025 | — | — |
| 25 | 24 | 35 | 4098 | 5120 | 6100 | 6312 | — | — |
| 26 | 18 | 40 | 3648 | 5300 | 6375 | 5200 | — | — |
| 27 | 23 | 35 | 3955 | 5313 | 6237 | 5962 | — | — |
| 28 | 23 | 36 | 3868 | 5093 | 6225 | 5937 | — | — |

*Estimate

What is claimed is:

1. A hydratable cement powder which during the early stages of hydration produces an amount of ettringite equal to from about 40% to about 60% of the weight of the cement/water paste, said powder comprising, by weight, from about 18% to about 65% high alumina cement, from about 16% to about 35% calcium sulfate, from 0% to about 65% portland cement, and from 0% to about 8.5% extraneous lime, said portland cement and said extraneous lime being alternative or complementary sources of from about 3.5% to about 8.5% of calcium oxide during hydration of the cement powder.

2. The cement powder of claim 1 wherein the weight ratio of high alumina cement to calcium sulfate is from about 1:1 to about 2.5:1, the weight ratio of extraneous lime to calcium sulfate ranges up to about 0.4:1, and the weight ratio of portland cement to calcium sulfate ranges up to about 4:1.

3. The cement powder of claim 1 wherein the amounts of the components are: from about 20% to about 60% high alumina cement, from about 18% to about 30% calcium sulfate, from 0 to about 45% portland cement and from 0 to about 6% extraneous lime.

4. The cement powder of claim 1 wherein the ratio of high alumina cement to calcium sulfate is from about 1.8:1 to about 2.4:1, the ratio of extraneous lime to calcium sulfate ranges up to about 0.3:1, and the ratio of portland cement to calcium sulfate ranges up to about 3:1.

5. The cement powder of claim 4 wherein the ratio of high alumina cement to calcium sulfate is from about 2:1 to 2.4:1, the ratio of portland cement to calcium sulfate is from about 0.1:1 to about 2:1 and the ratio of calcium oxide to calcium sulfate is from about 1:10 to about 1:5.

6. The cement powder of claim 1 wherein the amounts of the components are: from about 30% to about 60% high alumina cement, from about 20% to about 30% calcium sulfate, from about 2% to about 6% extraneous lime, and from about 3% to about 40% portland cement.

7. The cement powder of claim 3 wherein the amount of calcium oxide provided by the portland cement and/or the extraneous lime is from about 4% to about 6% of the total weight of the powder.

8. The cement powder of claim 6 wherein the amount of calcium oxide provided by the portland cement and/or the extraneous lime is from about 4.5% to about 5.5% of the total weight of the powder.

9. The cement powder of claim 6 wherein the weight ratio of high alumina cement to calcium sulfate is from about 2:1 to about 2.3:1, the weight ratio of portland cement to calcium sulfate is from about 1:5 to about 2:1 and the weight ratio of extraneous lime to calcium sulfate is from about 1:10 to about 1:5.

10. The cement powder of claims 1 or 6 characterized further by the presence of a dispersant.

11. The cement powder of claims 1 or 6 characterized further by the presence of a pozzolan.

12. A cementitious mixture comprising the hydratable cement powder of claim 1 and water.

13. The cementitious mixture of claim 12 wherein the water/cement powder ratio is from about 0.25 to about 0.8.

14. The cementitious mixture of claim 12 characterized further by the presence of an aggregate.

15. The cementitious mixture of claim 14 wherein the cement powder/aggregate ratio is from about 2:1 to about 1:20.

16. The cementitious mixture of claim 12 wherein the weight ratio of high alumina cement to calcium sulfate is from about 1:1 to about 2.5:1, the weight ratio of extraneous lime to calcium sulfate ranges up to about 0.4:1, and the weight ratio of portland cement to calcium sulfate ranges up to about 4:1.

17. A cementitious mixture comprising the cement powder of claims 5, 8, or 9 and water.

18. A cementitious mixture comprising the cement powder of claim 10 and water.

19. The cementitious mixture of claim 18 further comprising an aggregate.

20. The cementitious mixture of claim 19 wherein the water/cement powder ratio is from about 0.25 to about 0.8.

21. A cementitious mixture comprising the cement powder of claim 6, water, and aggregate, said mixture having a compressive strength of up to about 8000 p.s.i. within about 4 hours after the commencement of hydration.

* * * * *